(12) United States Patent
Chahley et al.

(10) Patent No.: US 10,051,779 B2
(45) Date of Patent: Aug. 21, 2018

(54) INDEPENDENTLY CONTROLLED METER ROLLERS AND AIR CONVEYANCE COMPONENTS SYSTEM AND METHOD

(71) Applicant: CNH Industrial Canada, Ltd., Saskatoon (CA)

(72) Inventors: Dennis W. Chahley, Saskatoon (CA); Gordon Anthony Engel, Saskatoon (CA); Jack Donald Turner, Saskatoon (CA); Dennis George Thompson, Saskatoon (CA); Gregory Jacob Erker, Saskatoon (CA); Trevor Lawrence Kowalchuk, Saskatoon (CA); Anthony Charles Rapley, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/695,898

(22) Filed: Sep. 5, 2017

(65) Prior Publication Data

US 2017/0359946 A1    Dec. 21, 2017

Related U.S. Application Data

(62) Division of application No. 14/932,817, filed on Nov. 4, 2015, now Pat. No. 9,756,777.

(Continued)

(51) Int. Cl.
*B65G 53/14* (2006.01)
*A01C 7/08* (2006.01)

(52) U.S. Cl.
CPC .................................. *A01C 7/081* (2013.01)

(58) Field of Classification Search
CPC .... B65G 53/14; B65G 53/4625; A01C 7/081; A01C 7/082; A01C 15/04
(Continued)

(56) References Cited

U.S. PATENT DOCUMENTS

| 5,873,533 A | 2/1999 | Sandbrook |
|---|---|---|
| 5,915,313 A | 6/1999 | Bender et al. |

(Continued)

FOREIGN PATENT DOCUMENTS

| CA | 2311698 | 12/2001 |
|---|---|---|
| WO | 2011053286 | 5/2011 |

OTHER PUBLICATIONS

Memory, Russell, and Rick Atkins, "Air Seeding—The North American Situation," 1990. http://www1.agric.gov.ab.ca/$department/deptdocs.nsf/all/eng9937/$file/Air.pdf?OpenElement.

(Continued)

*Primary Examiner* — Joseph Dillon, Jr.
(74) *Attorney, Agent, or Firm* — Rebecca L. Henkel; Rickard K. DeMille

(57) ABSTRACT

The present disclosure includes an agricultural system having first and second product meters configured to meter product to first and second lines, respectively. First and second motors are coupled to the first and second product meters and configured to drive them at first and second metering rates, respectively. An air source is configured to provide first and second airflows to the first and second lines, respectively. A controller electrically coupled to the first and second motors is configured to receive first and second inputs indicative of first and second numbers of first and second outlets fluidly coupled to the first and second lines, respectively. The controller is configured to instruct the first and second motors to drive the first and second product meters at the first and second metering rates, respectively, (Continued)

based on the first and second inputs, and to instruct the air source to provide the first and second airflows with first and second dynamic pressures or first and second velocities.

6 Claims, 7 Drawing Sheets

Related U.S. Application Data

(60) Provisional application No. 62/074,814, filed on Nov. 4, 2014.

(58) Field of Classification Search
USPC .... 111/174; 406/12, 63, 123, 128, 129, 130, 406/144, 197
See application file for complete search history.

(56) References Cited

U.S. PATENT DOCUMENTS

| | | | |
|---|---|---|---|
| 6,024,035 A | | 2/2000 | Flamme |
| 6,192,813 B1 * | | 2/2001 | Memory ................ A01C 7/081 |
| | | | 111/176 |
| 6,296,425 B1 | | 10/2001 | Memory et al. |
| 6,626,120 B2 | | 9/2003 | Bogner et al. |
| 6,644,225 B2 | | 11/2003 | Keaton |
| 6,661,514 B1 | | 12/2003 | Tevs et al. |
| 6,851,377 B2 | | 2/2005 | Mayerle et al. |
| 7,395,769 B2 | | 7/2008 | Jensen |
| 7,617,785 B2 | | 11/2009 | Wendte |
| 7,726,251 B1 | | 6/2010 | Peterson et al. |
| 8,170,325 B2 | | 5/2012 | Beaujot et al. |
| 8,281,725 B2 | | 10/2012 | Wendte et al. |
| 8,307,771 B2 | | 11/2012 | Cannon et al. |
| 8,504,310 B2 | | 8/2013 | Landphalr et al. |
| 8,522,770 B2 | | 9/2013 | Colburn et al. |
| 8,601,963 B2 | | 12/2013 | Friggstad |
| 8,671,857 B2 | | 3/2014 | Kowalchuk et al. |
| 8,690,488 B2 | | 4/2014 | Jagow et al. |
| 8,695,396 B2 | | 4/2014 | Landphair et al. |
| 8,701,576 B2 | | 4/2014 | Friggstad |
| 8,714,097 B2 | | 5/2014 | Friggstad |
| 8,857,353 B2 * | | 10/2014 | Kowalchuk .............. A01C 7/08 |
| | | | 111/174 |
| 8,869,718 B2 | | 10/2014 | Binsirawanich et al. |
| 9,119,338 B2 * | | 9/2015 | Alsater ................ A01B 69/007 |
| 9,144,190 B2 | | 9/2015 | Henry et al. |
| 9,578,800 B2 | | 2/2017 | Beaujot et al. |
| 9,580,256 B2 | | 2/2017 | Wagers et al. |
| 9,585,305 B2 * | | 3/2017 | Henry .................... A01C 7/082 |
| 2011/0054743 A1 | | 3/2011 | Kocer et al. |
| 2012/0211503 A1 | | 8/2012 | Barsi et al. |
| 2012/0227647 A1 | | 9/2012 | Gelinske et al. |
| 2012/0266795 A1 | | 10/2012 | Silbernagel et al. |
| 2012/0325130 A1 | | 12/2012 | Kowalchuk |
| 2013/0061790 A1 | | 3/2013 | Binsirawanich et al. |
| 2013/0192503 A1 | | 8/2013 | Henry et al. |
| 2014/0076217 A1 | | 3/2014 | Liu et al. |
| 2014/0076218 A1 | | 3/2014 | Liu et al. |
| 2014/0216315 A1 | | 6/2014 | Beaujot et al. |
| 2015/0216109 A1 | | 8/2015 | Meyer et al. |
| 2016/0165792 A1 * | | 6/2016 | Henry .................... A01C 7/102 |
| | | | 406/14 |
| 2016/0212930 A1 * | | 7/2016 | Renault ................. A01C 7/081 |

OTHER PUBLICATIONS a-m-e.co, Factory Direct Planters Built to your Specific Needs Brochure, Website: http://a-m-e.co/index-ad.html,012, pp. 1-5.

* cited by examiner

INDEPENDENTLY CONTROLLED METER ROLLERS AND AIR CONVEYANCE COMPONENTS SYSTEM AND METHOD

CROSS-REFERENCE TO RELATED APPLICATIONS

This application is a divisional of U.S. patent application Ser. No. 14/932,817, entitled "INDEPENDENTLY CONTROLLED METER ROLLERS AND AIR CONVEYANCE COMPONENTS SYSTEM AND METHOD," filed Nov. 4, 2015, which claims priority from and the benefit of U.S. Provisional Application Ser. No. 62/074,814, entitled "INDEPENDENTLY CONTROLLED METER ROLLERS AND AIR CONVEYANCE COMPONENTS SYSTEM AND METHOD," and filed Nov. 4, 2014. Each of the foregoing applications is hereby incorporated by reference in its entirety for all purposes.

BACKGROUND

The present disclosure relates generally to product distribution systems for agricultural implements and, more particularly, to independent control of meter rollers and air conveyance components of the product distribution system.

Generally, agricultural implements (e.g., seeders) are configured to distribute product (e.g., seeds and fertilizer) across a field. The agricultural implement may improve crop yield and/or farming efficiency by providing an even distribution of the product across the field and/or increasing speed at which the product is distributed across the field.

However, traditional product distribution systems for agricultural implements often distribute agricultural product, at any given time, to multiple rows (e.g., via multiple row units) using meters that are coupled to a single drive shaft that drives the meters at a single rate. Unfortunately, meters driven by a single drive shaft or at a single rate may reduce farming efficiency and accuracy.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an agricultural system includes first and second product meters configured to meter product from a product tank to first and second lines, respectively. First and second motors are coupled to the first and second product meters and configured to drive them at first and second metering rates, respectively. An air source is configured to provide first and second airflows to the first and second lines, respectively. A controller electrically coupled to the first and second motors is configured to receive first and second inputs indicative of first and second numbers of first and second outlets fluidly coupled to the first and second lines, respectively. The controller is configured to instruct the first and second motors to drive the first and second product meters at the first and second metering rates, respectively, based on the first and second inputs, and to instruct the air source to provide the first and second airflows with first and second dynamic pressures or first and second velocities.

In a second embodiment, a control system configured to control an agricultural product distribution system includes a controller configured to receive a first input indicative of a first number of first openers fluidly coupled to a first primary distribution line and a first meter configured to meter product from a product tank, and to receive a second input indicative of a second number of second openers fluidly coupled to a second primary distribution line and a second meter configured to meter product from the product tank. The controller is configured to determine a first target metering rate of the first meter based on the first number and a second target metering rate of the second meter based on the second number. The controller is also configured to instruct a first motor to drive the first meter at the first target metering rate, to instruct a second motor to drive the second meter at the second target metering rate, and to instruct an air source to provide a first airflow to the first primary distribution line and a second airflow to the second primary distribution line based on the first and second target metering rates.

In a third embodiment, a method of operating a product distribution system of an agricultural implement includes receiving, at a processor, a first signal indicative of a first number of first outlets fluidly coupled to a first meter configured to meter product from a product tank. The method also includes receiving, at the processor, a second signal indicative of a second number of second outlets fluidly coupled to a second meter configured to meter product from the product tank. Further, the method includes determining, via the processor, a first target metering rate for the first meter and a second target metering rate for the second meter based on the first and second numbers. Further still, the method includes outputting, via the processor, a third signal to the first meter and a fourth signal to the second meter, where the third and fourth signals are indicative of instructions to enable the first meter to provide the first target metering rate and the second meter to provide the second target metering rate, respectively. The method also includes outputting, via the processor, at least a fifth signal to an air source of the product distribution system, where the fifth signal is indicative of instructions to enable delivery, via the air source, of a first airflow having a first velocity to a first primary distribution line fluidly coupled to the first meter and a second airflow having a second velocity to a second primary distribution line fluidly coupled to the second meter, where the first and second velocities are based on the first and second target metering rates.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
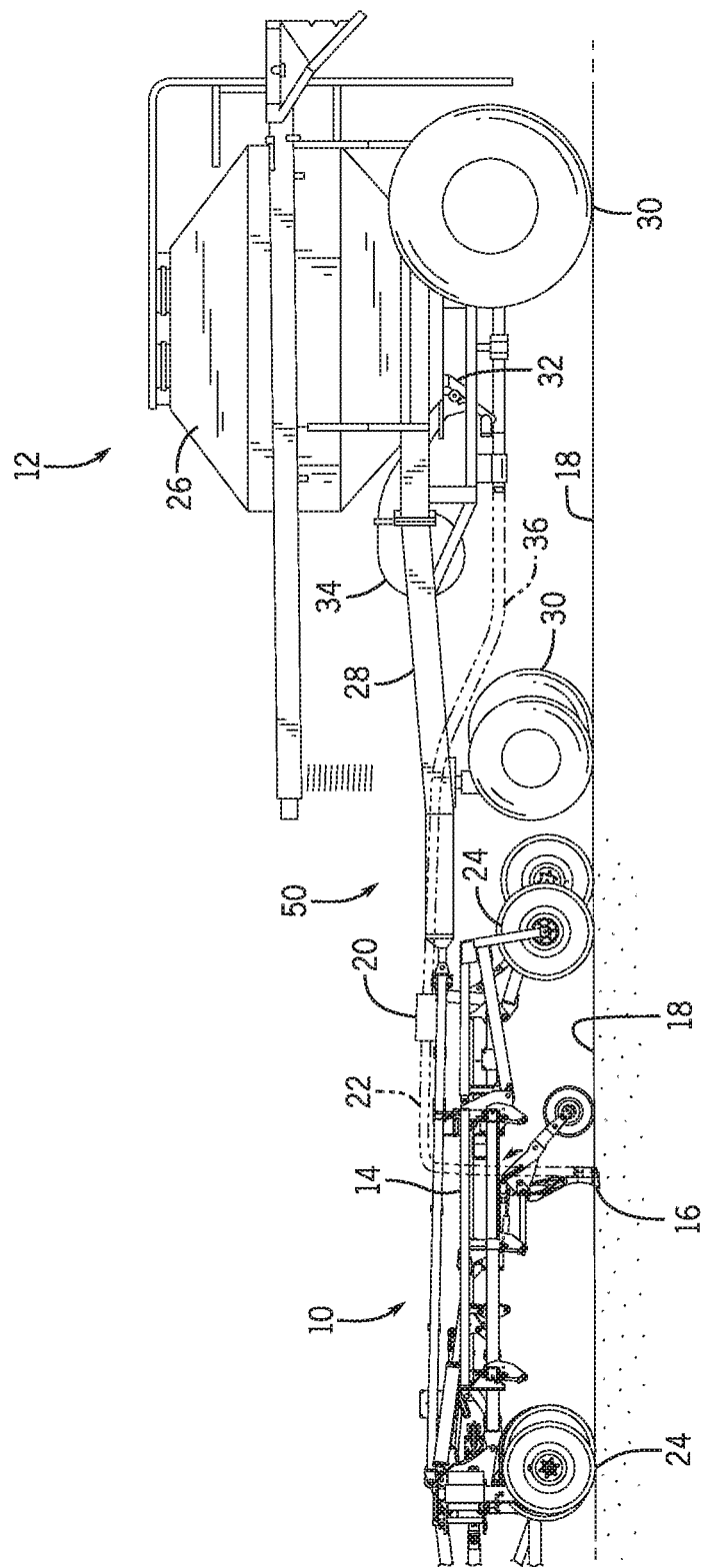
FIG. 1 is a side view of an embodiment of an agricultural implement having a product distribution system with independently controllable meter rollers and airflows.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate generally to product distribution systems for agricultural implements and, more specifically, to independently controllable meter rollers and air conveyance components of the product distribution system. For example, the product distribution system includes a metering system with independently controllable meter rollers, each meter roller being configured to distribute product to a corresponding primary distribution line coupled to the meter roller. Each meter roller is also coupled to a respective motor configured to drive (e.g., turn) the meter roller, and each motor is electrically, hydraulically, or otherwise coupled to a controller of the product distribution system. Accordingly, the controller may independently control a turning rate of each motor, thereby independently controlling (e.g., driving) the turning rate of each meter roller.

The product distribution system also includes an air conveyance system for providing airflows to convey the metered product through the primary distribution lines, secondary distribution lines coupled to the primary distribution lines, and outlets coupled to the secondary distribution lines. The airflow to each primary distribution line may be independently controllable, such that each primary distribution line receives an airflow with an air pressure and/or a velocity suitable for the particular primary distribution line and/or the amount of product metered to the particular primary line. Accordingly, the airflows in each primary distribution line can be adjusted to accommodate the amount of product metered to each primary distribution line (e.g., to effectively and efficiently deliver the product through each primary distribution line). A controller may be communicatively coupled to the air conveyance system and to each of the motors of the product distribution system. Thus, the controller may independently control each motor and/or the air conveyance system to provide customized turn rates to each motor (and, thus, metering rates to each meter) and airflows to each primary distribution line, respectively. Each airflow and turn rate, for example, may be adjusted based on an input to the controller indicative of a number of outlets coupled to each primary distribution line. It should be noted, however, that independent control of the meters may be done separately, and independent of, independent control of the one or more airflows. Further, independent control of each airflow may be done separately, and independent of, independent control of the meters.

To help illustrate, a side view of a portion of an agricultural implement having a product distribution system is shown in FIG. 1. In the illustrated embodiment, an implement 10 is coupled to an air cart 12 such that the air cart 12 is towed behind (or in front of) the implement 10 during operation and transport. The implement 10 includes a tool frame 14 with a ground engaging tool 16 (e.g., opener, row unit, outlet). The ground engaging tool 16 is configured to excavate a trench into the soil 18 for seed and/or fertilizer deposition. In the illustrated embodiment, the ground engaging tool 16 receives product (e.g., seed and/or fertilizer) from a product distribution header 20 via a hose 22 (e.g., secondary line) extending between the header 20 and the ground engaging tool 16. Although only one ground engaging tool 16, product distribution header 20, and hose 22 are shown in the illustrated embodiment to facilitate discussion, it should be appreciated that the implement 10 includes additional tools 16, headers 20 and/or hoses 22 (e.g., secondary lines) to facilitate product delivery to the soil 18 in a number of rows across the field. Further, as illustrated, the implement 10 includes one or more wheel assemblies 24 which contact the soil surface 18 and enable the implement 10 to be pulled by a tow vehicle.

As discussed above, the air cart 12 is coupled to the implement 10, and towed behind (or in front of) the implement 10. As will be appreciated, in certain embodiments, the air cart 12 may be towed directly behind a tow vehicle, with the implement 10 towed behind the air cart 12. Likewise, the implement 10 and the air cart 12 may be part of a single unit, or the implement 10 and the air cart 12 may be separate units that are coupled together.

The air cart 12 includes a storage tank 26 (e.g., product tank), a frame 28, wheels 30, a metering system 32, and an air source 34. The frame 28 includes a towing hitch configured to couple to the implement 10 or tow vehicle. In certain configurations, the storage tank 26 includes multiple compartments for storing various flowable particulate materials. For example, one compartment may include seeds, and another compartment may include a dry fertilizer. Alternatively, the air cart 12 may include multiple tanks, each tank configured to store a different agricultural product. In either configuration, the air cart 12 may be configured to deliver both the seeds and the fertilizer to the implement 10. In general, seeds and/or fertilizer within the storage tank 26 are gravity fed into the metering system 32.

In the present embodiment, the metering system 32 includes sectioned, independently controllable meter rollers to regulate the flow of material from the storage tank 26 into an airflow provided by the air source 34. The airflow (e.g., from the air source 34) then carries the material through hoses 36 (e.g., primary lines or primary distribution lines) to the implement 10, thereby supplying the ground engagement tools 16 with seeds and/or fertilizer for deposition within the soil. Although only one primary distribution line 36 is shown in the illustrated embodiment to facilitate discussion, embodiments of the present disclosure generally include multiple primary distribution lines 36, where each primary distribution line 36 is coupled to a respective header 20. For example, each meter roller of the metering system 32 may be coupled to its own primary distribution line 36, and each primary distribution line 36 may be coupled to its own header 20. Further, each header 20 may be coupled to its own set of secondary lines or hoses 22, which each includes its own ground engaging tool 16 (e.g., opener or outlet). Further still, the air source 34 is controllable such that the air source 34 may provide airflows with different pressures and/or velocities to each primary distribution line 36. For example, the air source 34 may provide an airflow with a first pressure and velocity to a first primary distribution line 36 and an airflow with a second pressure and velocity to a second primary distribution line 36, where the first pressure and velocity is different than the second pressure and velocity. It should be noted that the storage tank 26, the metering system 32, the primary distribution lines 36, the headers 20, the secondary lines 22, and the ground engaging tools 16 may all be components of what will be referred to herein as a product distribution system 50 of the combined air cart 12 and implement 10.

In accordance with present embodiments, a control system or assembly may be communicatively coupled to the illustrated metering system 32 and to the air source 34 (or components thereof) to regulate metering of product from the storage tank 26 to the implement 10 and airflow from the air source 34 to the primary distribution lines 36 (and, thus, the secondary distribution lines 22). The control assembly may independently control each meter roller of the metering system 32. For example, the control assembly may independently control motors coupled to each meter roller, thereby independently controlling a turn rate of the motors and, thus, the meter rollers. In other words, each meter roller may include an independently controllable turn rate. In accordance with present embodiments, the control assembly may determine a turn rate for each motor and, thus, for each meter roller coupled to each respective motor, based at least in part on a number of outlets coupled to each meter roller. For example, the control assembly may instruct a lower metering rate (e.g., turn rate) to a first meter configured to feed seven outlets and a relatively higher second metering rate (e.g., turn rate) to a second meter of the same metering system 32 configured to feed eight outlets. Additionally, the control assembly may instruct the air source 34 to provide a first airflow with a higher velocity via fan rotational speed (and, thus, a higher dynamic pressure) to the primary distribution line 36 that includes more secondary lines 22 (and, thus, more ground engaging tools 16 (e.g., openers, outlets, row units)) and a second air flow with a relatively lower dynamic pressure to the primary distribution line 36 that includes fewer secondary lines 22 (and, thus, fewer ground engaging tools 16 (e.g., openers, outlets, row units)). The control assembly and related features will be described in detail below with reference to later figures.

Figure 2:
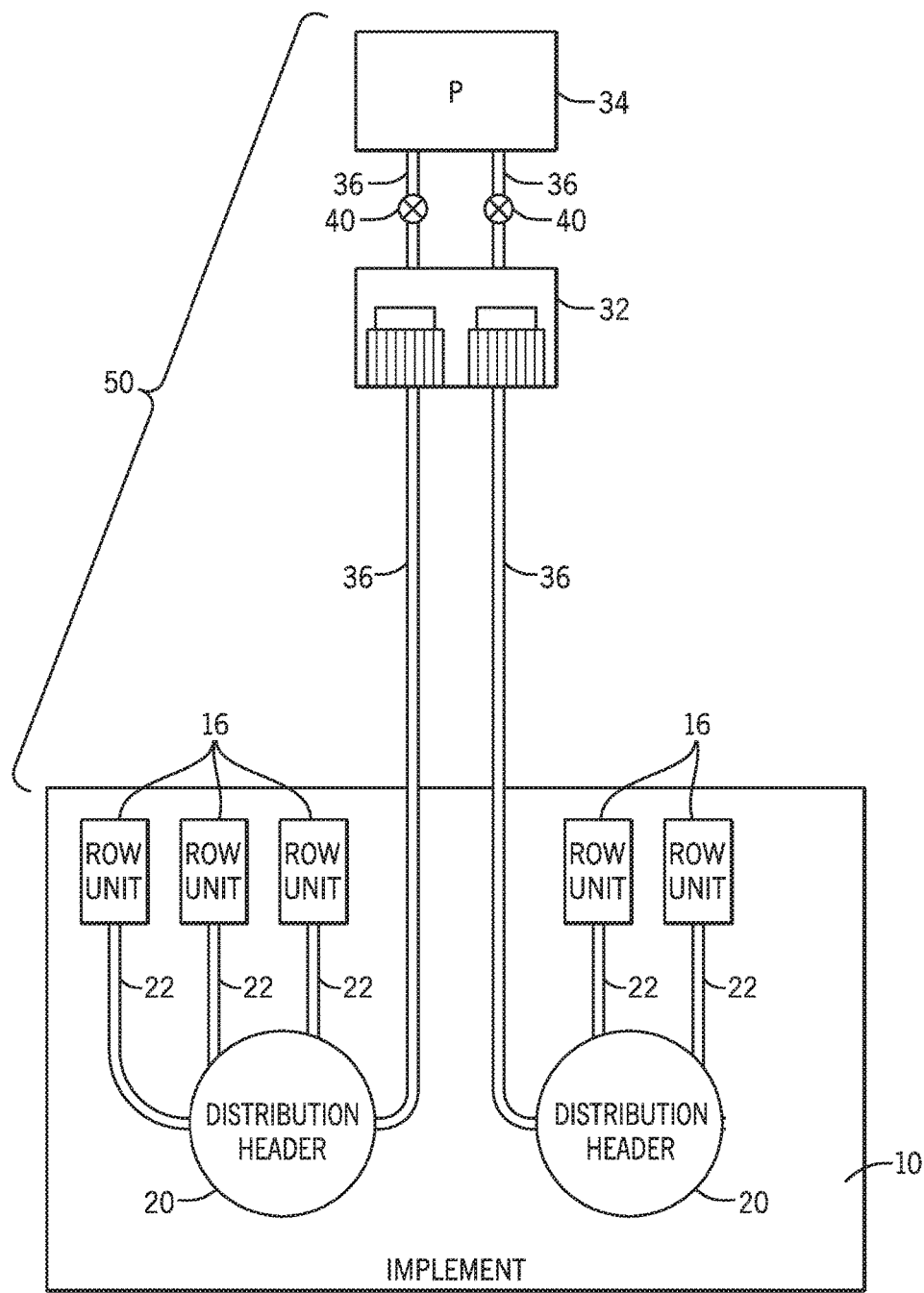
FIG. 2 is a schematic view of a portion of an embodiment of the agricultural implement of FIG. 1 having the product distribution system.

To facilitate a better understanding of the agricultural implement 10 and air cart 12 described above with reference to FIG. 1, a schematic diagram of an embodiment of the air cart 12 coupled to the implement 10 is shown in FIG. 2. In the illustrated embodiment, the product distribution system 50 includes at least the product metering system 32, the primary distribution lines 36, the distribution headers 20, the secondary distribution lines 22, the ground engaging tools 16 (e.g., row units, openers, outlets), and the air source 34. Product is delivered from the air cart 12 to the ground engaging tools 16 using the product distribution system 50. For example, product may initially be located in the air cart 12 (e.g., within a storage tank). The product distribution system 50 transfers the product using the product metering system 32 to primary distribution lines 36. The primary distribution lines 36 transfer the product to distribution headers 20 positioned on the implement 10. Further, the distribution headers 20 divide the product through secondary distribution hoses or lines 22 to deliver the product to the ground engaging tools 16 (e.g., outlets, openers, row units) of the implement 10. In the illustrated embodiment, the air source 34 provides airflow to the primary distribution lines 36, the headers 20, and the secondary distribution lines 22. Accordingly, the air source 34 provides a biasing force, via the airflows, to urge the product through the product distribution system 50 to the field. The product is entrained in the airflows and carried through the product distribution system 50 to the field. The air source may blow the air through the product distribution system 50 starting at or around a position of the coupling between the primary distribution lines 36 and the metering system 32. For example, in the illustrated embodiment, product is gravity fed into the metering system 32 from above the metering system 32. The air source 34 provides airflows to the primary distribution lines 36 from just behind the metering system 32. Accordingly, the metering system 32 meters product to the primary distribution lines 36, and the airflow carries the metered product toward the ground engaging tools 16 (e.g., row units). It should also be noted that the number of primary distribution lines 36, the number of distribution headers 20, the number of secondary lines 22, and the number of ground engaging tools 16 (e.g., row units) may vary depending on the embodiment. For example, the product distribution system 50 may include 2, 3, 4, 5, 6, 7, 8, 9, 10 or more primary distribution lines 36 and corresponding headers 20. Further, each header 20 may include 2, 3, 4, 5, 6, 7, 8, 9, 10, or more secondary distribution lines 22 and corresponding ground engaging tools 16 (e.g., outlets, openers, row units).

It should also be noted that, in accordance with present embodiments, the illustrated product metering system 32 includes a separate, independently controllable meter (e.g., meter roller) for each primary distribution line 36, where each separate meter roller meters (e.g., dispenses) agricultural product from a product storage tank of the air cart 12 to its respective primary distribution line 36. Further, the air source 34 is controllable to provide different airflows with different airflow conditions (e.g., pressure and velocity) to each primary distribution line 36. Accordingly, the metering rates for each meter roller are independently controllable, and the airflow is independently controllable to accommodate the independent metering rates. Thus, as shown in the illustrated embodiment, if a first primary distribution line 36 provides product to a first number of ground engaging tools 16 (e.g., two ground engaging tools 16 (e.g., row units)), and a second primary distribution line 36 provides product to a second number of ground engaging tools 16 (e.g., three ground engaging tools 16 (e.g., row units)) different than the first number, the first primary distribution line 36 feeding product to fewer ground engaging tools 36 may receive less product (e.g., via a slower turn rate of the associated meter roller) than the primary distribution line 36 feeding more ground engaging tools 16.

Additionally, the airflow to each primary distribution line 36 may be independently controllable to accommodate the amount of product being routed through each primary distribution line 36. For example, in the illustrated embodiment, the air source 34 (e.g., fan or blower) may be coupled to both primary distribution lines 36. Each distribution line 36 may include its own flow regulation device 40 (e.g., dampers) configured to regulate the flow through the primary distribution line 36. The flow regulation device 40 may be a valve configured to permit or restrict the airflow. Alternatively, the flow regulation device 40 may be a venting valve (e.g., pressure relief valve) configured to vent a portion of the airflow from the primary distribution line 36. Accordingly, the airflow in each primary distribution line 36 may be controlled by a control system communicatively coupled to the flow regulation devices 40. Alternatively or additionally, the air source 34 may include multiple air sources (e.g., multiple fans or blowers), each fan coupled to and providing an airflow to its own respective primary distribution line 36. The control assembly may be coupled to each separate fan or blower to independently control each fan or blower. The control assembly and related components, including the metering system 32 and the air source 34 (e.g., air conveyance system), will be described in detail below with reference to later figures.

Figure 3:
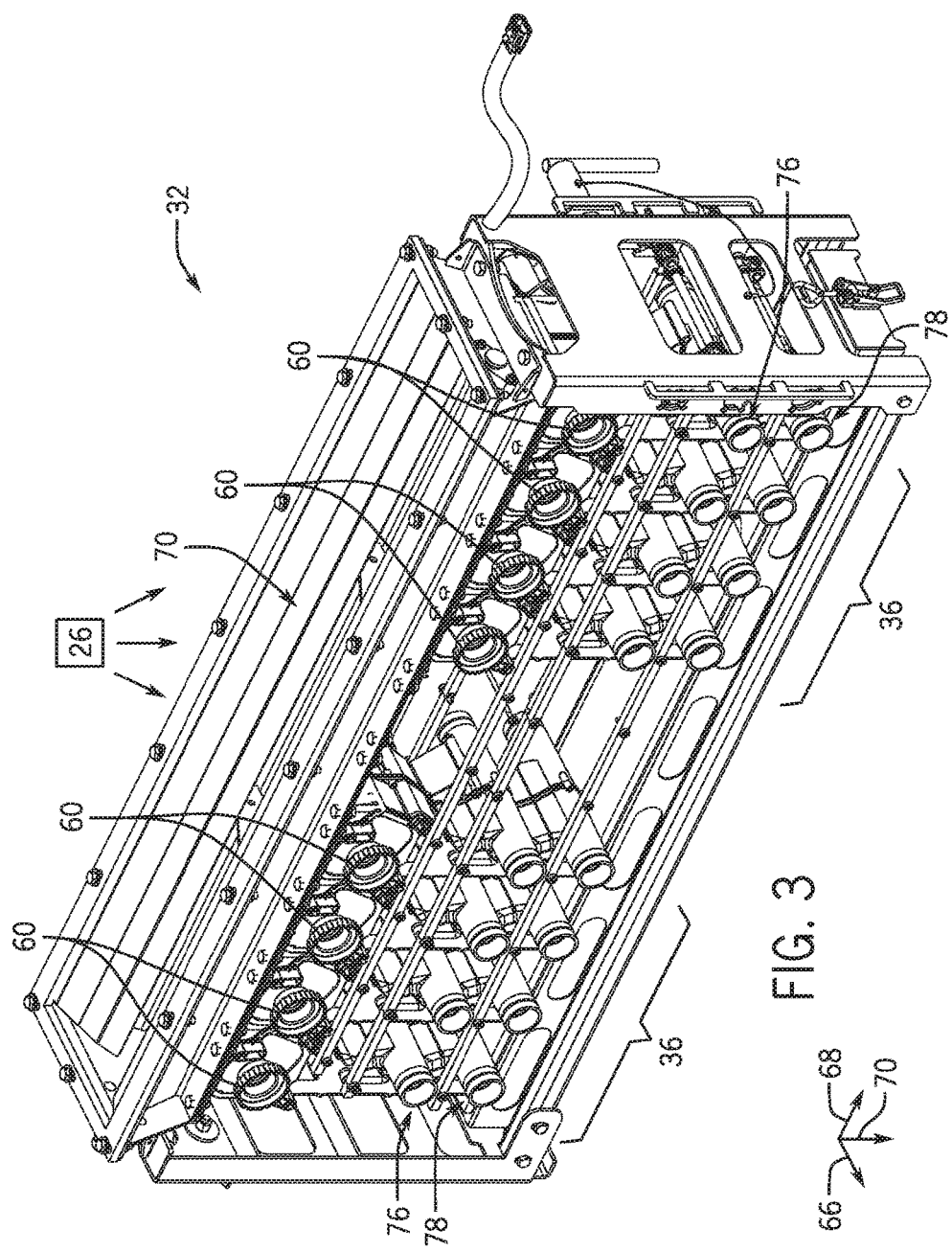
FIG. 3 is a perspective view of an embodiment of a product metering system having independently controllable meter rollers for use in the product distribution system of FIG. 1.

For example, a perspective view of an embodiment of the metering system 32, in accordance with the present disclosure, is shown in FIG. 3. In the illustrated embodiment, the product metering system 32 includes eight individual meter rollers 60 (e.g., meter modules). Each meter roller 60 is coupled to a respective motor 62, which is configured to drive the meter roller 60 into rotation. In the illustrated embodiment, the motors 62 are disposed behind the meter rollers 60 and, thus, are not all viewable. However, for clarity, an embodiment of one motor 62 and one corresponding meter roller 60 is shown in an exploded perspective view in FIG. 4. As shown, the motor 62 may be directly coupled to the meter roller 60, or the motor 62 may be coupled to a drive shaft that is also coupled to the respective meter roller 60.

Continuing with the embodiment in FIG. 3, the motors 62 are configured to drive the meter rollers 60 into rotation about a rotational axis 66 or direction. For example, the meter rollers 60 are disposed adjacent to one another in a line extending in a direction 68. The meter rollers 60 are positioned such that they rotate about a rotational axis 66 (e.g., direction), which is perpendicular to the direction 68. As the meter rollers 60 rotate, product from the storage tank 26 above the metering system 32 is gravity fed into a hopper 70 above the meter rollers 60 and down into each meter roller 60. The meter rollers 60 may be fluted such that adjacent ridges 72 (see FIG. 4) of the fluted roller 60 define a compartment 74 (see FIG. 4) into which the product is fed. Additionally or alternatively, the meter rollers 60 may be straight flutes, spiral flutes, knobbed rollers, or may otherwise having protrusions for metering product. As the meter rollers 60 turn, the product is supported within the compartment 74 until the compartment 74 gravity feeds the product downward (e.g., in direction 70) toward the primary distribution lines 36. As previously described, an air source may provide independently controllable airflows to each of the primary distribution lines 36, where the airflow pressure and/or velocity is controlled based on the amount of product being metered by each meter roller 60.

It should be noted that, in the illustrated embodiment, a top row of connectors 76 for a top row of primary distribution lines 36 and a bottom row of connectors 78 for a bottom row of primary distribution lines 35 are provided. For example, each meter roller 60 includes a top row of connectors 76 and a bottom row of connectors 78 directly below the meter roller 60. However, each meter roller 60 only accesses one of the two connectors 76, 78 and corresponding primary distribution lines 36 disposed below the meter roller 60. The metering system 32 includes the top and bottom rows of connectors 76, 78 and corresponding primary distribution lines 36 to enable isolated distribution of seed and fertilizer. For example, the seed may be distributed via the illustrated metering system 32 through the meter rollers 60 to the top row of connectors 76. Another metering system 32 may be configured to distribute fertilizer through its meter rollers 60 to the bottom row of connectors 78, which extend between the two metering systems 32.

Figure 5:
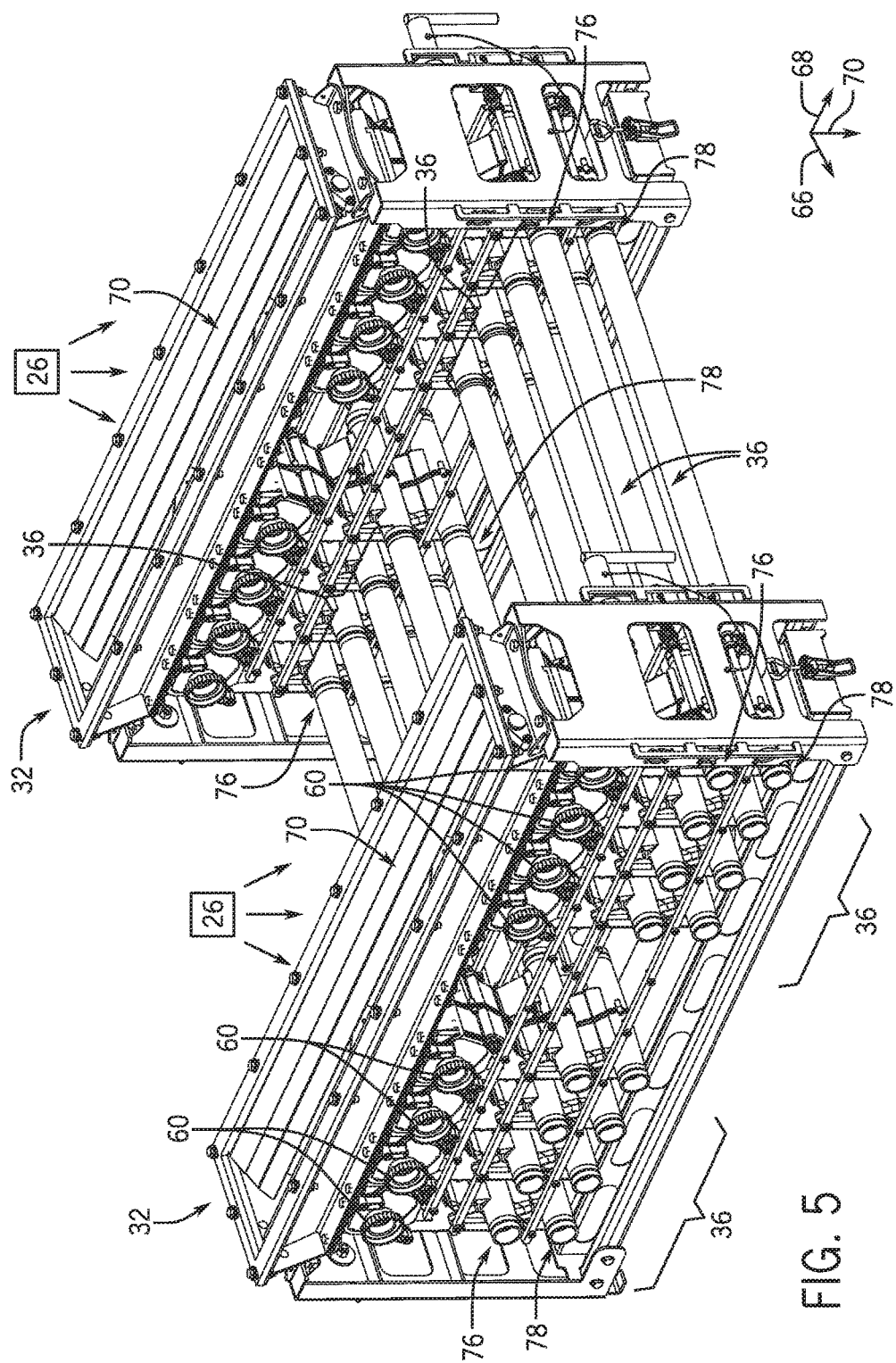
FIG. 5 is a perspective view of an embodiment of two of the product metering systems of FIG. 3 in series.

For example, a perspective view of an embodiment having two metering systems 32 to meter seed to the top row of connectors 76 and corresponding primary distribution lines 36 and fertilizer to the bottom row of connectors 78 and corresponding primary distribution lines 36 is shown in FIG. 5. In the illustrated embodiment, the metering systems 32 distribute product in direction 66. Accordingly, the metering system 32 disposed downstream, relative to direction 66, from the other metering system 32 may be referred to herein as the "downstream metering system 32." Likewise, the metering system 32 disposed upstream, relative to direction 66, of the downstream metering system may be referred to herein as the "upstream metering system 32."

The upstream metering system 32 includes meter rollers 60 in fluid communication with the bottom row of connectors 78 and isolated from the top row of connectors 76. The meter rollers 60 are, as previously described, in fluid communication with the hopper 70 directly above the meter rollers 60 and directly below the storage tank 26, where the storage tank stores fertilizer. As the meter rollers 60 are driven into rotation via the motors 62 (see FIG. 4), fertilizer is metered to the bottom row of connectors 78 (and, thus, to the primary distribution lines 36 coupled to the top row of connectors 78).

The downstream metering system 32 includes meter rollers 60 in fluid communication with the top row of connectors 76 and corresponding primary distribution lines 36 and isolated from the bottom row of connectors 78 and corresponding primary distribution lines 36. The meter rollers 60 are in fluid communication with the hopper 70 directly above the meter rollers 60 and directly below the storage tank 26, where the storage tank stores seed. As the meter rollers 60 are driven into rotation via the motors 62 (see FIG. 4), seed is metered to the primary top row of connectors 76 (and, thus, the primary distribution lines 36 coupled to the top row of connectors 76). The top rows of connectors 76 of the upstream and downstream metering systems 32 are coupled together, and the bottom rows of connectors 78 of primary distribution lines 36 of the upstream and downstream metering systems 32 are coupled together. Accordingly, both the seed and fertilizer are distributed to the row units. Depending on the embodiment, the top and bottom rows of connectors 76, 78 and respective primary distribution lines 36 may have separate headers, or they may have a common header and common secondary lines.

It should be noted that the top and bottom rows of connectors 76, 78 and the upstream and downstream metering systems 32 could be used for either seed or fertilizer, or any other agricultural product metered to an agricultural implement. The illustrated configuration and the description above should not limit the scope of the present disclosure, as one of ordinary skill in the art would recognize that the systems could be used interchangeably with a number of different agricultural products.

Figure 4:
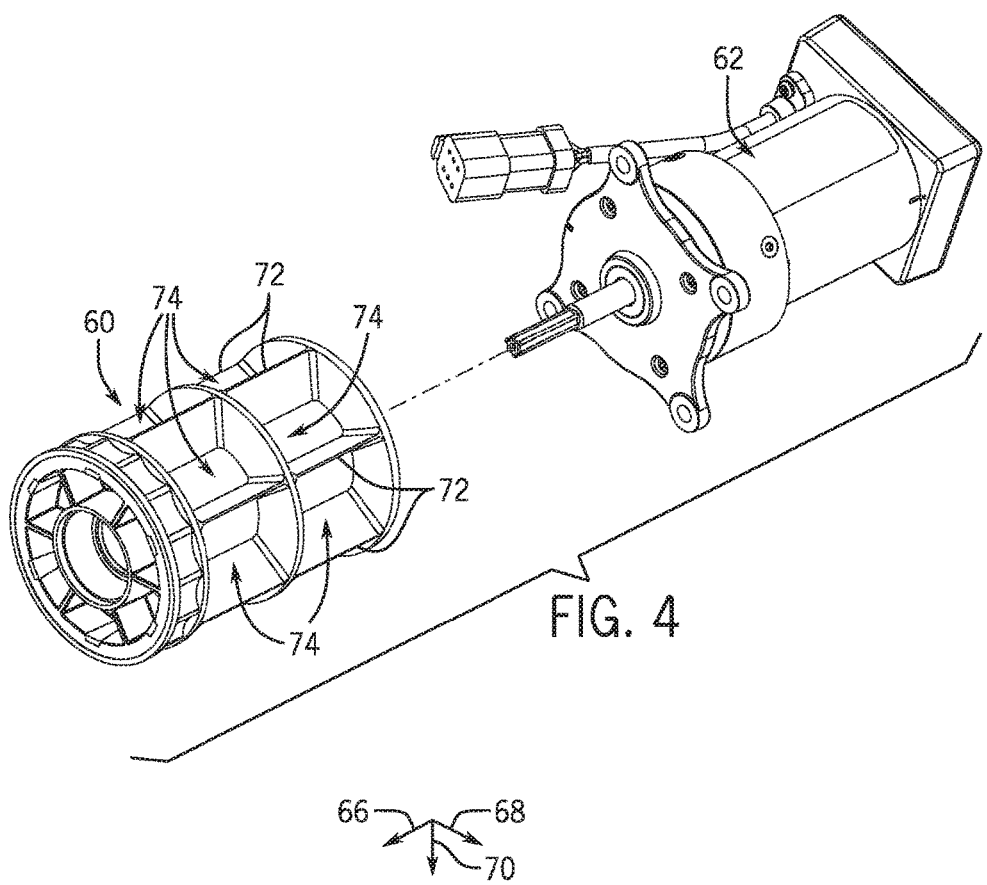
FIG. 4 is an exploded perspective view of an embodiment of a meter roller and a corresponding motor for use in the product metering system of FIG. 3.

Further, it should be noted that the individual meter rollers 60 and their respective motors 62 shown in FIGS. 3-5 are independently controllable, as previously described. For example, a control assembly or control system, in accordance with present embodiments, may independently control a metering rate of each meter roller 60 by independently controlling a turn rate of each respective motor 62. Further still, as previously described, an air source (e.g., air source 34 in FIGS. 1-3) may provide independently controllable airflows to each of the primary distribution lines 36, where the airflow pressure/velocity is controllable based at least in part on the amount (e.g., product mass flow rate) of product being metered by each meter roller 60. The control assembly or system will be described in detail below with reference to later figures.

Figure 6:
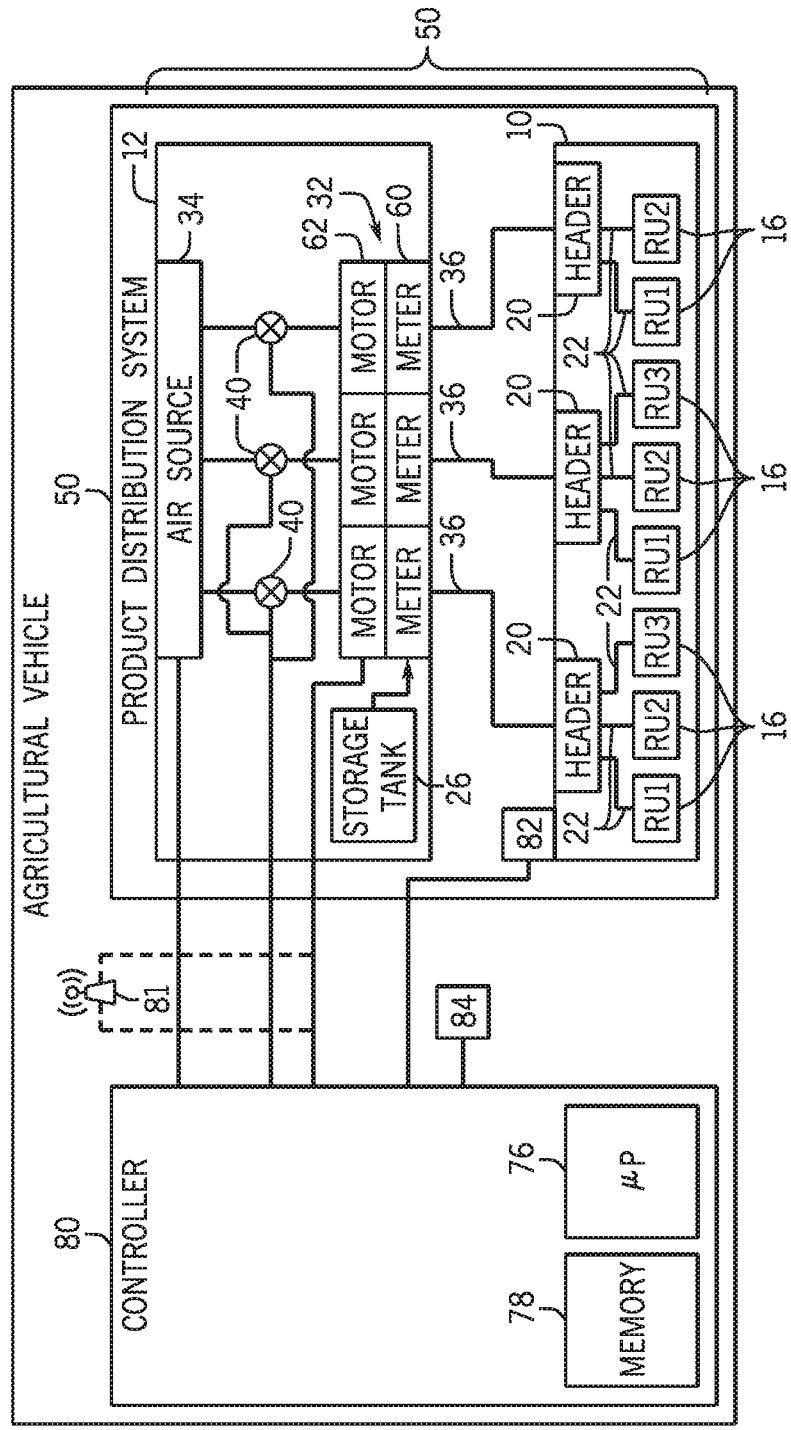
FIG. 6 is a schematic view of a portion of an embodiment of the agricultural implement of FIG. 1 having the product distribution system with independently controllable meter rollers and airflows.

A schematic diagram of an embodiment of a control system configured to control various aspects of the disclosed metering system 32, in accordance with the present disclosure, is shown in FIG. 6. In the illustrated embodiment, a controller 80 of the control system is communicatively coupled to the metering system 32, to the air source 34, and to the flow regulating devices 40 (e.g., which may be considered components of the air source 34). The controller 80 includes a processor, such as a microprocessor 76, and a memory device 78. The controller 80 may also include one or more storage devices and/or other suitable components. The processor 76 may be used to execute software, such as software for controlling the metering system 32, an airflow system (e.g., the air source 34) coupled to the metering system 32, and so forth. Moreover, the processor 76 may include multiple microprocessors, one or more "general-purpose" microprocessors, one or more special-purpose microprocessors, and/or one or more application specific integrated circuits (ASICS), or some combination thereof. For example, the processor 76 may include one or more reduced instruction set (RISC) processors and/or one or more complex instruction set (CISC). It should be noted that the controller 80 may instruct the metering system 32 to perform various functions. Accordingly, any reference herein to the controller's 80 instruction of various components or sub-components of, or in connection with, the metering system 32 may refer to control of the metering system 32 itself.

The memory device 78 may include a volatile memory, such as random access memory (RAM), and/or a nonvolatile memory, such as ROM. The memory device 78 may store a variety of information and may be used for various purposes. For example, the memory device 78 may store processor-executable instructions (e.g., firmware or software) for the processor 76 to execute, such as instructions for controlling, e.g., the metering system 32. The storage device(s) (e.g., nonvolatile storage) may include read-only memory (ROM), flash memory, a hard drive, or any other suitable optical, magnetic, or solid-state storage medium, or a combination thereof. The storage device(s) may store data or inputs (as described below), instructions (e.g., software or firmware for controlling the metering system 32, the air conveyance system (e.g., the air source 34), or the like), and any other suitable data.

As described above, the controller 80 may be communicatively coupled to the metering system 32, to the air source 34, and to the flow regulating devices 40. For example, the controller 80 may be electrically coupled to the metering system 32 and the air source 34, or the controller 80 may be coupled to the metering system 32 and the air source 34 via a wireless system 81 (e.g., Internet system, Wi-Fi system, Bluetooth system). Additionally or alternative, the controller 80 may be coupled to the metering system 32 and the air source 34 via a fiber optics system. In particular, the controller 80 is communicatively coupled to each of the motors 62 of the metering system 32, such that the controller 80 may control independent drive rates (e.g., turn rates) of each of the motors 62 that are then imparted to the respective meter rollers 60. Because the controller 80 is coupled to all three of the motors 62 in the illustrated embodiment, and each motor 62 drives one meter roller 60 independent of the other meter rollers 60, the controller 80 can independently control a turn rate of each meter roller 60. In other words, if desired, the controller 80 can instruct a different metering rate for each meter roller 60 by instructing, e.g., a different turn rate for each motor 62. Further, because the controller 80 is coupled to each flow regulating device 40 (e.g., of the air conveyance system), the airflow in each primary distribution line 36 may be independently controlled. Additionally or alternatively, the controller 80 may be communicatively coupled to the air source 34 to directly control the air source 34. For example, the air source 34 may include three separate fans coupled to each respective primary distribution line 36, and the controller 80 may independently control each of the three fans to provide varying airflow conditions, as described below. Further still, in some embodiments, the air source 34 may include one fan coupled to all or to a subset of the primary distribution lines 36, where the one fan is configured to supply a single airflow to all the primary distribution lines 36 coupled to the one fan based on an average of the metering rates instructed to the meter rollers 60 by the controller 80.

In the illustrated embodiment, as previously described, the control system (e.g., having the controller 80) is configured to control turn rates of the motors 62 (and, thus, turn rates of the meter rollers 60 coupled to the motors 62). It should be noted that the turn rate of the motor 62 may refer to a turn rate of an output shaft of the motor 62, as the motor 62 may include an integral or internal gearbox that imparts a different turn rate to the output shaft than that of the motor 62 itself. Further, it should be noted that multiple motors 62 and/or corresponding meter rollers 60 may be coupled to a common drive shaft. For example, separate gear assemblies for the motors 62 may enable the motors 62 and/or corresponding meter rollers 60 to include different turn rates, relative to each other, even when coupled to the common drive shaft. Alternatively, each motor 62 and/or corresponding meter roller 60 may include its own drive shaft, which may be drive via instruction by the controller 80.

In general, the turn rate of the motor 62 referred to herein is considered substantially the same as the turn rate of the meter roller 60. However, in some embodiments, a gear system, chain belt, or belt drive system may also couple the motor 62 to the meter roller 60, thereby imparting a different turn rate to the meter roller 60 than that of the motor 62.

Accordingly, the controller 80 is configured to effectively control independent metering rates of each meter rollers 60. In particular, the controller 80 is configured to control independent metering rates of each meter roller 60 based on a number of ground engaging tools 16 disposed downstream, and fluidly coupled to, each meter roller 60 (e.g., based on the number of outlets to which the meter roller 60 provides product). In the illustrated embodiment, two of the meter rollers 60 are each fluidly coupled to three ground engaging tools 16. A third meter roller 60 is coupled to only two ground engaging tools 16. Accordingly, it may be desirable to provide a higher metering rate for the two meter rollers 60 having three ground engaging tools 16 and a relatively lower metering rate for the meter roller 60 having two ground engaging tools 16.

The controller 80 is configured to receive inputs (e.g., signals) indicative of the number of ground engaging tools 16 associated with each meter roller 60, and instruct an appropriate turning rate, based on the respective numbers of ground engaging tools 16, to each motor 62 coupled to the meter rollers 60. For example, the controller 80 may be configured to receive the inputs via manual entry of the inputs into the controller 80 (e.g., via an input 84) by an operator. In some embodiments, the controller 80 may receive the inputs automatically via one or more sensors 82 communicatively coupled to the controller 80 (e.g., via electrical wiring, via the wireless system 81, and/or via a fiber optics system) and may determine the number of ground engaging tools 16 (e.g., row units) fluidly coupled to each meter roller 60 (e.g., to each respective primary line 26 of each meter roller 60). The sensors 82 may detect the number of ground engaging tools 16 in any suitable manner. For example, the sensors 82 may sense a pressure in the header 20 fluidly coupled to the ground engaging tools 16, or the sensors 82 may receive data from (e.g., read or contact) one or more information elements (e.g., microchips) of the one or more secondary lines 22 coupled to the header 20, where the information elements (e.g., microchips) provide information relating to the number of ground engaging tools 16 coupled to the header 20. The inputs may directly indicate the number of ground engaging tools 16 fluidly coupled to each primary distribution line 36, or the inputs may directly indicate a number of secondary lines 22 coupled to each header 20. For example, the inputs may be communicated from the implement 10 to the air cart 12 via CAN (controller area network) bus.

Additionally, as previously described, the controller 80 is communicatively coupled to the air source 34. Based on the inputs described above (e.g., the number of ground engaging tools 16 coupled to each meter roller 60), the controller 80 may control the air source 34 to provide appropriate airflows to each primary distribution line 36. Thus, the controller 80 instructs the air source 34 to provide an appropriate airflow to effectively and efficiently convey the product being metered by each meter roller 60, as described above. It should be noted that the controller 80 may instruct the air source 34 by controlling the flow regulating devices 40 coupled to each primary distribution line 36 (e.g., as previously described), or the air source 34 may include a separate fan or blower for each primary distribution line 36 and the controller 80 may control each separate fan. Accordingly, the controller 80 may instruct airflows with specific air pressures and/or flow velocities for each distribution line 36. This may facilitate substantially uniform and/or efficient distribution of product to each ground engaging tool 16, and/or may reduce product clogs in the product distribution system 50. It should be noted that, in some conditions, it may be desirable to block metering to one or more of the primary distribution lines 36. In such conditions, the controller 80 may instruct the flow regulation device 40 of the primary distribution line 36 to block or substantially reduce the airflow to the primary distribution line 36 (e.g., via closure of the valve), the fan coupled to the primary distribution line 36 to discontinue providing the airflow, and/or the motor 62 and associated meter roller 60 to stop rotating (e.g., to stop metering of the product).

In general, independent control of each meter roller 60 (via each motor 62), and control of the air source 34, as described above, enables the controller 80 to instruct turning rates and airflows that facilitate substantially uniform distribution of product to each ground engaging tool 16 of the agricultural implement 10. The controller 80, in the illustrated embodiment, may simultaneously instruct both the air source 34 and the motors 62, in accordance with the description above, based on the input(s) to the controller 80 regarding the number of ground engaging tools 16 per each primary distribution line 36.

Figure 7:
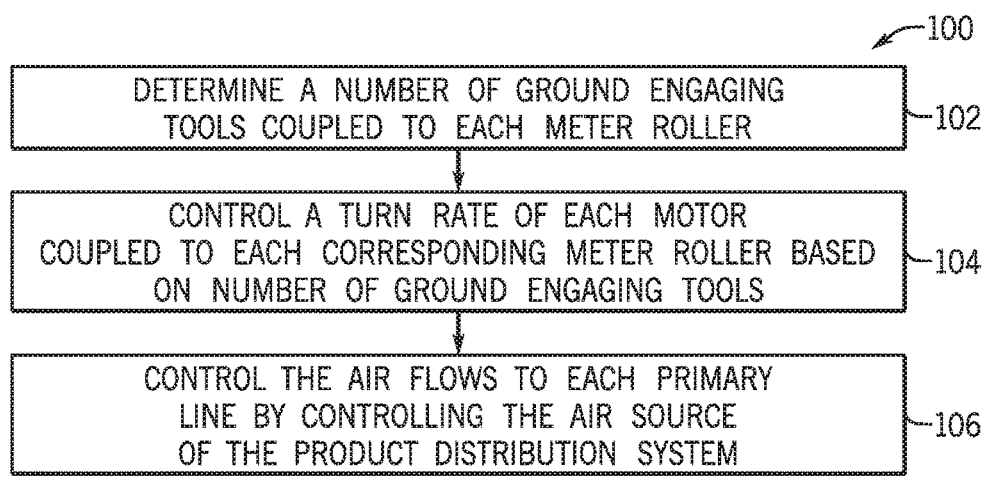
FIG. 7 is a process flow diagram of an embodiment of a method of operating a control system for controlling the product distribution system of FIG. 1.

Turning now to FIG. 7, a process flow diagram illustrating a method 100 of operating the control system (e.g., having the controller 80) is shown. In the illustrated embodiment, the method 100 includes determining a number of ground engaging tools 16 fluidly coupled to each meter roller 60 (block 102). For example, the controller 80 may receive inputs indicative of the number of engaging tools 16 coupled to each meter roller 60. If the product distribution system 50 includes eight meter rollers 62, for example, the controller 80 may receive eight separate inputs. The inputs may be entered into the controller 80 via an operator, or the inputs may be automatically received by the controller 80 from a sensor configured to detect the number of ground engaging tools 16 coupled to each meter roller 60, as previously described. The inputs may directly indicate the number of ground engaging tools 16 coupled to each meter roller 60, or the inputs may indicate a number of secondary lines 22 coupled to each primary distribution line 36 extending from each meter roller 60.

Further, in accordance with present embodiments, the method 100 includes independently controlling, via the controller 80, a turn rate of each motor 62 coupled to each corresponding meter roller 60 (block 104) based on the number of corresponding ground engaging tools 16. In doing so, the controller 80 controls an amount (e.g., a mass flow rate) of product metered by each meter roller 60 to each corresponding primary distribution line 36, thereby providing substantially uniform distribution of product to each ground engaging tool 16 of the agricultural implement 10. Further still, the method 100 includes controlling the airflows to each primary distribution line 36 by controlling the air source 34 and/or flow regulating devices 40 of the product distribution system 50 via the controller 80 (block 106). As previously described, the airflows are controlled, via the controller 80, to enable an appropriate airflow to each primary distribution line 36 based on the amount of product metered to each primary distribution line 36 and, thus, based on the number of ground engaging tools 16 fluidly coupled to (e.g., being fed product by) each primary distribution line 36. Accordingly, it should be understood that, in the presently described embodiment, the inputs to the controller 80 (e.g., the number of ground engaging tools 16 associated with each meter roller 60 and, thus, each primary distribution line 36) enable the controller 80 to determine control aspects for both the metering system 32 and the air source 34 of the air conveyance system substantially simultaneously.

By providing the above described control system, meter rollers of the metering system may be independently controlled to enable metering of appropriate amount of product (product mass flow rate) to each primary line based on the number of outlets (e.g., ground engaging tools, openers, row units) fluidly coupled to (e.g., being fed by) each primary line (e.g., via the secondary lines). Accordingly, if one meter is fluidly coupled to fewer outlets than another meter, the controller of the control system may instruct a lower metering rate/or and a different airflow to the meter coupled to fewer outlets than the meter coupled to a greater number of outlets. In doing so, a substantially uniform amount of product is metered to each outlet of the entire agricultural implement, thereby providing substantially uniform distribution of product across all rows of a field.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A method of operating a product distribution system of an agricultural implement, comprising:
receiving, at a processor, a first signal indicative of a first number of first outlets fluidly coupled to a first meter that meters product from a product tank;
receiving, at the processor, a second signal indicative of a second number of second outlets fluidly coupled to a second meter that meters product from the product tank;
determining, via the processor, a first target metering rate for the first meter and a second target metering rate for the second meter based on the first and the second numbers; and
outputting, via the processor, a third signal to the first meter and a fourth signal to the second meter, wherein the third and fourth signals are indicative of instructions to enable the first meter to provide the first target metering rate and the second meter to provide the second target metering rate, respectively; and
outputting, via the processor, at least a fifth signal to an air source of the product distribution system, wherein the fifth signal is indicative of instructions to enable delivery, via the air source, of a first airflow having a first velocity to a first primary distribution line fluidly coupled to the first meter and a second airflow having a second velocity to a second primary distribution line fluidly coupled to the second meter, wherein the first and second velocities are based on the first and second target metering rates.

2. The method of claim 1, wherein receiving the first signal and the second signal comprises receiving a first manual input and a second manual input, respectively, from an operator.

3. The method of claim 1, wherein the third and fourth signals are output to a first motor coupled to the first meter and a second motor coupled to the second meter to drive the first and second meters at the first and second target metering rates, respectively.

4. The method of claim 1, comprising receiving the product from the product tank at the first and the second meters and using the first and second meters to meter the product at the first target metering rate and the second target metering rate, respectively.

5. The method of claim 1, wherein the air source comprises a fan configured to deliver the first airflow to the first primary distribution line and the second airflow to the second primary distribution line, wherein outputting, via the processor, at least the fifth signal to the air source of the product distribution system comprises outputting the fifth signal to a first flow regulating device configured to enable a first pressure of the first airflow and outputting a sixth signal to a second flow regulating device configured to enable a second pressure of the second airflow.

6. The method of claim 1, wherein the air source comprises a fan configured to deliver the first airflow to the first primary distribution line and the second airflow to the second primary distribution line, wherein outputting, via the processor, at least the fifth signal to the air source of the product distribution system comprises outputting the fifth signal to a first flow regulating device configured to enable the first velocity of the first airflow and outputting a sixth signal to a second flow regulating device configured to enable the second velocity of the second airflow.

\* \* \* \* \*